(12) United States Patent
Van Reatherford

(10) Patent No.: US 6,260,520 B1
(45) Date of Patent: Jul. 17, 2001

(54) HOMOGENEOUS CHARGE COMPRESSION IGNITION INTERNAL COMBUSTION ENGINE

(75) Inventor: Larry Van Reatherford, Clarkston, MI (US)

(73) Assignee: Ford Global Technologies, Dearborn, MI (US)

( * ) Notice: Subject to any disclaimer, the term of this patent is extended or adjusted under 35 U.S.C. 154(b) by 0 days.

(21) Appl. No.: 09/192,418

(22) Filed: Nov. 16, 1998

(51) Int. Cl.⁷ ...................................................... F02B 75/04
(52) U.S. Cl. .................................. 123/48 AA; 123/48 A; 123/78 A
(58) Field of Search .............................. 123/48 AA, 48 A

(56) References Cited

U.S. PATENT DOCUMENTS

| | | | |
|---|---|---|---|
| 2,125,407 | * 8/1938 | Tsuneda | 123/48 AA |
| 2,145,017 | * 1/1939 | Tsuneda | 123/48 AA |
| 2,163,015 | * 6/1939 | Wagner | 123/48 AA |
| 2,316,790 | * 4/1943 | Hickey | 123/48 AA |
| 2,914,047 | * 11/1959 | Colton | 123/48 AA |
| 4,384,553 | 5/1983 | Schechter . | |
| 4,516,537 | * 5/1985 | Nakahara et al. | 123/48 AA |
| 4,860,711 | 8/1989 | Morikawa . | |
| 4,987,863 | * 1/1991 | Daly | 123/48 AA |
| 5,063,883 | * 11/1991 | Dingess | 123/48 R |
| 5,476,072 | 12/1995 | Guy . | |

FOREIGN PATENT DOCUMENTS

| | | |
|---|---|---|
| 3541190 | 5/1987 | (DE) . |
| 11-107792A | 4/1999 | (JP) . |
| WO98/07973 A1 | 2/1998 | (WO) . |
| WO 98/10179 | 3/1998 | (WO) . |

* cited by examiner

*Primary Examiner*—Willis R. Wolfe
*Assistant Examiner*—Jason Benton
(74) *Attorney, Agent, or Firm*—Ford Global Technologies

(57) ABSTRACT

A HCCI engine includes a cylinder block with a cylinder head closing off a cylinder, a power piston slidably contained within the cylinder, and a boost piston for initiating timed combustion of fuel within a combustion chamber. The boost piston is housed within a wall of the combustion chamber such that when the boost piston moves from a base position to an extended position, the heat increase within the combustion chamber is sufficient to cause fuel within the combustion chamber to ignite.

16 Claims, 2 Drawing Sheets

HOMOGENEOUS CHARGE COMPRESSION IGNITION INTERNAL COMBUSTION ENGINE

TECHNICAL FIELD

The present invention relates to a homogeneous charge compression ignition internal combustion engine (HCCI) in which a premixed charge fires without the need of a sparkplug.

BACKGROUND DISCLOSURE INFORMATION

The HCCI engine offers tantalizing potential for low hydrocarbon emissions and low NOx emissions coupled with significant fuel economy improvement. Unlike its better known compression ignition cousin, the diesel engine, the HCCI engine may be operated soot free and also with low NOx emissions because there is no locally rich zone of combustion. Rather, ignition occurs spontaneously and concurrently at many points in the combustion chamber. A problem heretofore, however, has resided in the lack of capability to precisely control the onset of the ignition event. The present invention solves this problem.

Another problem with previous HCCI engines was the apparent inability to operate satisfactorily on fuels having a wide range of cetane or octane ratings. An engine according to this present invention has adaptable timing capability which will allow fuel quality to be accurately and adequately handled.

SUMMARY OF THE INVENTION

An HCCI engine includes a cylinder block having a cylinder formed therein, a cylinder head mounted upon the cylinder block for closing the cylinder, and a piston slidably contained within the cylinder. A combustion chamber is defined by the cylinder head, the cylinder and the piston. The piston is attached to a crankshaft by means of a connecting rod. A fuel system, which may comprise either a carburetor or direct cylinder injection system or port fuel injection system, introduces fuel to the combustion chamber.

A boost piston initiates timed combustion of fuel within the combustion chamber. The boost piston is housed within a wall of the combustion chamber, such as the cylinder head, so that when the piston moves from a base position to an extended position, the effective compression ratio of the cylinder increases. A driver moves the boost piston from the base position to the extended position during successive cycles of the engine so as to cause fuel within the combustion chamber to burn in response to movement of the boost piston to the extended position. In essence, when the boost piston moves from the base position to the extended position, during each compression stroke of the engine, the concomitant increase of heat within the combustion chamber is sufficient to initiate combustion.

The driver which moves the boost piston from its base position to the extended position may comprise a camshaft powered by the engine's crankshaft, with the camshaft being mounted within the cylinder head and having at least one lobe for contacting an upper surface of the boost piston. The phase relationship between the camshaft and crankshaft may be variable, which allows the timing of the movement of the boost piston to be varied by a controller which senses a plurality of engine operating parameters and determines an appropriate time for the boost piston to be moved. In this manner, the controller will minimize unwanted variations in pressure within the combustion chamber. This will allow adaptability of the present engine to changes in the octane or cetane rating of fuel being burned by the engine.

According to another aspect of the present invention, the present engine may further comprise a spark plug having electrodes extending within the combustion chamber such that cold starting and also misfire avoidance may be provided by the spark plug.

The controller will operate the driver so as to produce a relatively lower compression ratio in the event that the fuel has a lower octane rating and a relatively higher compression ratio in the event that the fuel has a higher octane rating. This is accomplished by varying the amount by which the boost piston moves into the combustion chamber as the boost piston moves from its base position to its extended position. Also, the controller will operate the driver so that the timing of the onset of combustion is advanced when the fuel has a higher octane rating and retarded when the fuel has a lower octane rating.

It is an advantage of the present invention that an engine equipped with the present system will offer lower hydrocarbon emissions, lower emissions of NOx, and lower emissions of $CO_2$.

It is a further advantage of the present invention that an engine according to this invention will operate with low smoke emissions and no knocking because combustion duration is reduced.

It is a further advantage of the present invention that an engine according to this invention will operate with much better fuel economy, as compared with premixed charge engines. This results at least in part from the ability of the present engine to operate without air throttling.

Other advantages as well as objects and features of the present invention will become apparent to the reader of this specification.

DETAILED DESCRIPTION OF PREFERRED EMBODIMENT(S)

Figure 1:
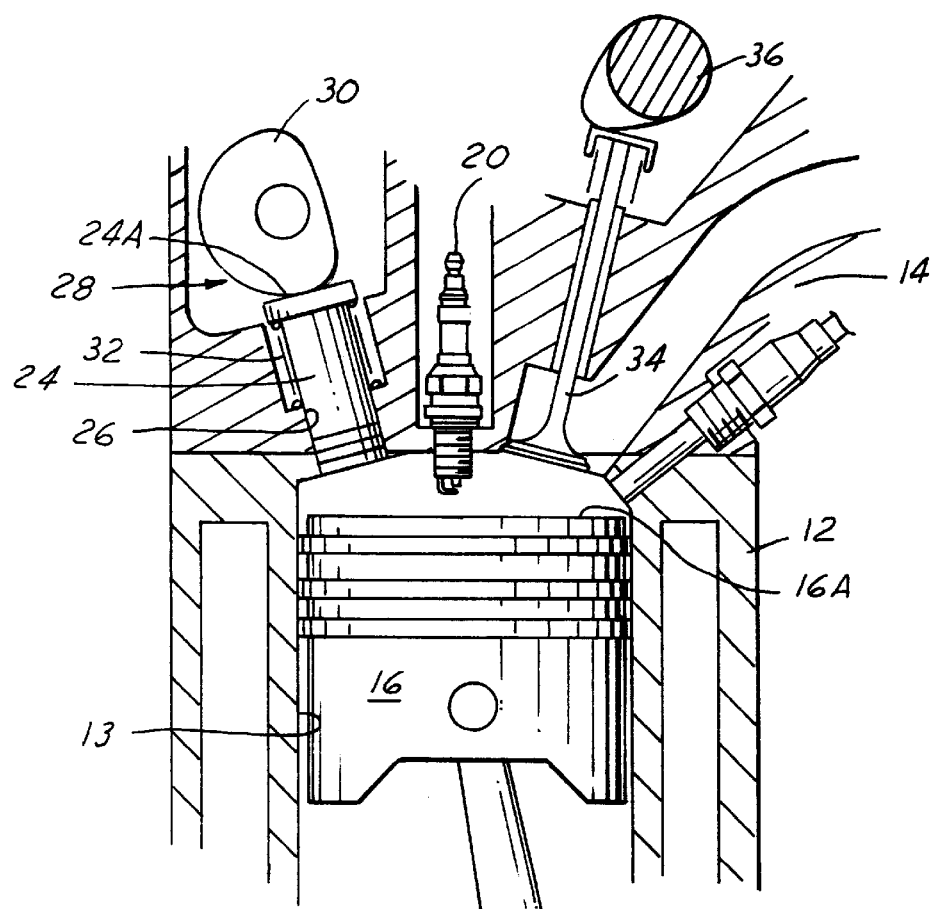
FIG. 1 is a schematic representation of an engine according to the present invention.

As shown in FIG. 1, engine 10 according to the present invention has cylinder block 12 and cylinder 13 which is closed by means of cylinder head 14. Power piston 16 is slidably contained within cylinder 13. A combustion chamber is defined by cylinder head 14, cylinder 13, and upper surface 16A of piston 16. Piston 16 is attached to crankshaft 18 by means of connecting rod 22. Spark plug 20 may be employed in an engine of the present invention according to the criteria described below. Fuel injector 23 may be located either as shown in FIG. 1, with fuel being introduced directly into the combustion chamber, or into intake port 25. As yet another alternative, fuel may be supplied via a carburetor.

Intake valve 34 allows fresh charge to enter engine 10. Valve 34 is operated by means of camshaft 36 in conventional fashion. Those skilled in the art will appreciate in view of this disclosure that camshaft phasing or timing changes may be employed with an engine according to the present invention.

Compression ignition is initiated with an engine according to the present invention by means of boost piston 24 which is contained within bore 26 formed within cylinder head 14. Boost piston 24 is driven by booster cam 28 having booster lobe 30 mounted thereto. As boost cam 28 rotates in response to motion of crankshaft 18, booster lobe 30 contacts upper surface 24A of boost piston 24 and forces boost piston 24 from its base position against the force of spring 32 to an extended position wherein the effective compression ratio of engine 10 increases. This causes a concomitant change in the heat within the combustion chamber sufficient to cause engine 10 to fire.

Those skilled in the art will appreciate in view of this disclosure that the phase relationship between booster camshaft 28 and crankshaft 18 may be changed through the use of several camshaft phasing mechanisms known to those skilled in the art of engine design and suggested by this disclosure. And, those skilled in the art will further appreciate in view of this disclosure that a boost piston driver according to the present invention could comprise not only the illustrated camshaft drive mechanism, but also electrohydraulic, pneumatic, solenoid, or other types of devices capable of producing the required linear motion of the boost piston.

Figure 3:
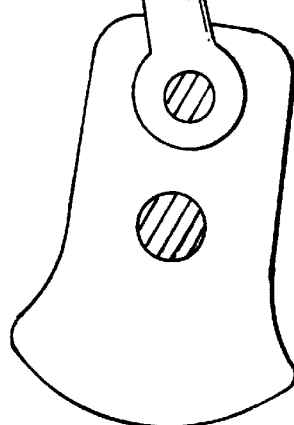
FIG. 3 is a block diagram illustrating a control system according to an aspect of the present invention.
Figure 3:
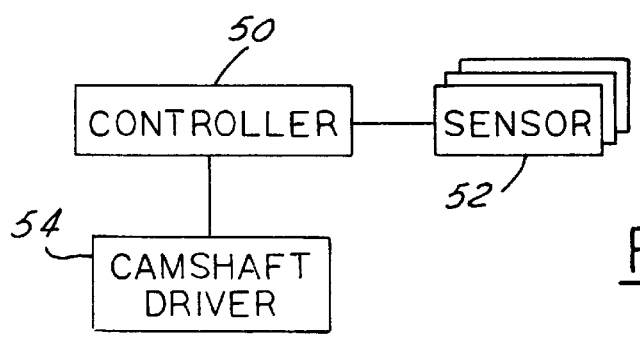

As shown in FIG. 3, controller 50, which receives a plurality of inputs from a plurality of sensors 52, operates booster- camshaft 28 so as to minimize unwanted variations in pressure within the combustion chamber. This is accomplished by either advancing or retarding the timing of camshaft 28 until smooth combustion is achieved. This may be necessary to accommodate changes in the octane or cetane rating of the fuel being burned by engine 10.

Controller 50 operates camshaft 28, or other type of driver used with an engine according to this system, to produce a relative lower compression ratio in the event that the fuel has a lower octane rating. This is accomplished by decreasing the amount to which boost piston 24 extends into the combustion chamber.

Figure 2:
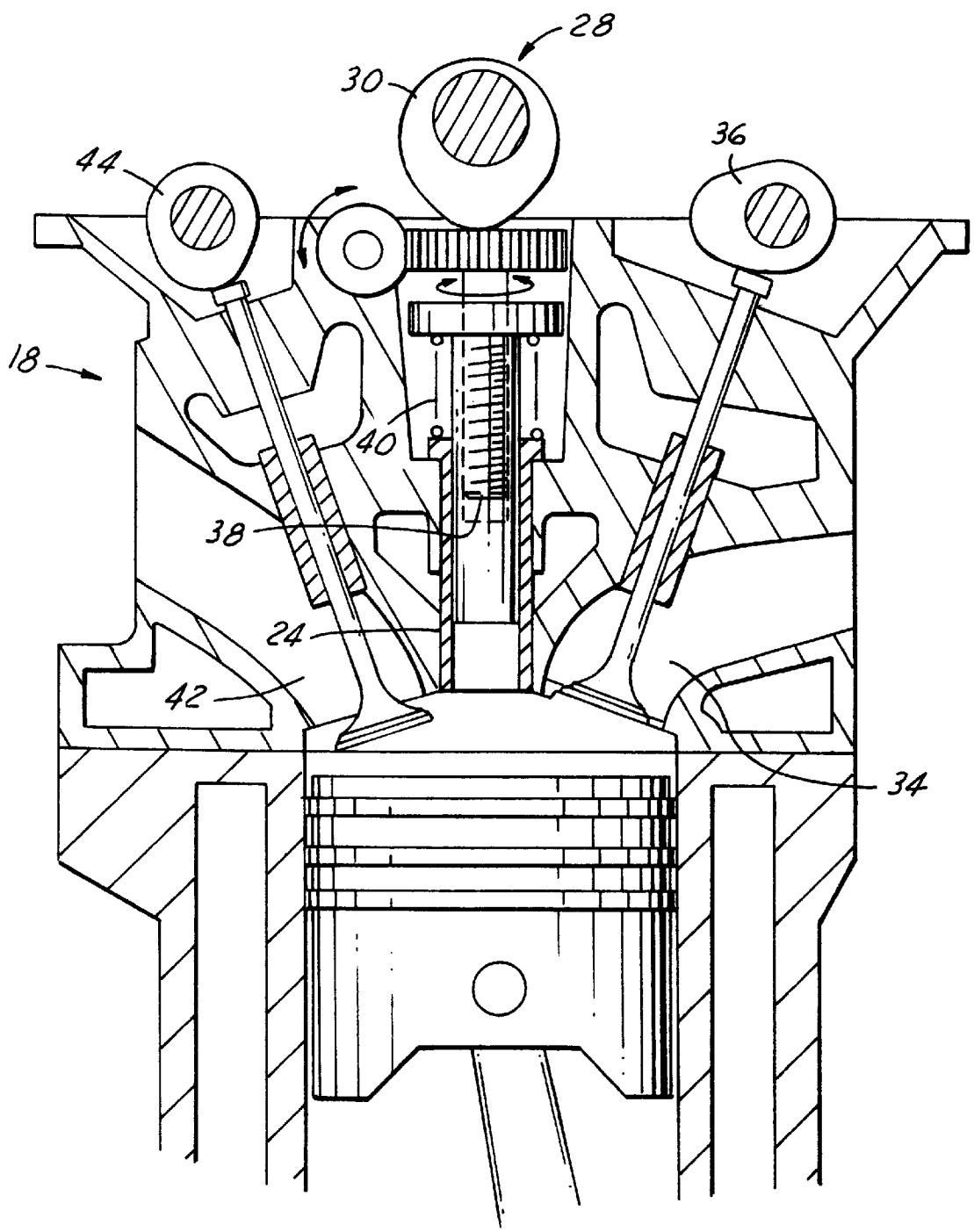
FIG. 2 is a schematic representation of a second engine having a variable compression ratio assist according to the present invention.

A means for controlling the extension of boost piston 24 is illustrated in FIG. 2. Thus, follower 38 is threadably engaged with boost piston 24, which is slidably mounted within sleeve 46. Follower 38 is rotatable by worm gear 40 in response to commands from controller 50. Gear head 38A of follower 38 is engaged by worm gear 40 such that when worm gear 40 is rotated by a motor (not shown) in response to a command from controller 50, the extension of follower 38 within boost piston 24 will be either increased or decreased, thereby changing the extent to which boost piston 24 extends into the combustion chamber.

When follower 38 extends to a greater extent within boost piston 24, the boost piston will not produce as great a final cylinder or combustion chamber pressure as when follower 38 extends from boost piston 24 by a greater extent, which will delay the onset of combustion and allow fuel of a lower octane to be used.

The engine of FIG. 2 illustrates yet another type of configuration in which a pentroof combustion chamber is employed with intake valve 34, exhaust valve 42, and centrally mounted boost piston 24. Exhaust valve 42 is driven by exhaust camshaft 44.

Yet another variation of this is shown with spark plug 20 in FIG. 1. Spark plug 20 may be operated so as to allow misfire-free operation in the event that an increase of heat within the combustion chamber, resulting from the movement of boost piston 24, is insufficient to initiate combustion. Spark plug 20 is also useful for initiating combustion when engine 10 is cold and in certain other operating regimes.

While the invention has been shown and described in its preferred embodiments, it will be clear to those skilled in the arts to which it pertains that many changes and modifications may be made thereto without departing from the scope of the invention.

What is claimed is:

1. A HCCI engine, comprising:
   a cylinder block having a cylinder formed therein;
   a cylinder head mounted upon the cylinder block for closing the cylinder;
   a power piston slidably contained within the cylinder;
   a combustion chamber defined by said cylinder head, said cylinder, and said power piston;
   a crankshaft, with said power piston being attached to said crankshaft by a connecting rod;
   a fuel system for introducing fuel into the combustion chamber;
   a boost piston for initiating timed combustion of fuel within the combustion chamber, with said boost piston being housed within a wall of said combustion chamber such that when the boost piston moves from a base position to an extended position the effective compression ratio of the cylinder increases, said boost piston being further selectively adjustable, effective to alter the extent to which said boost piston extends into said combustion chamber; and
   a driver for moving the boost piston from a base position to an extended position during successive cycles of the engine, so as to cause fuel within the combustion chamber to ignite in response to movement of the boost piston to the extended position.

2. A HCCI engine according to claim 1, wherein said driver moves the boost piston from the base position to the extended position during a compression stroke of the power piston.

3. A HCCI engine according to claim 1, wherein the boost piston is mounted with the cylinder head.

4. A HCCI engine according to claim 3, wherein the driver comprises a camshaft powered by the crankshaft, with the camshaft being mounted within the cylinder head and having at least one lobe for contacting an upper surface of the boost piston.

5. A HCCI engine according to claim 4, wherein the phase relationship between the camshaft and the crankshaft is variable.

6. A HCCI engine according to claim 1, further comprising a controller for sensing a plurality of engine operating parameters and for operating the driver in response to the values of the sensed operating parameters so as to minimize unwanted variations in pressure within the combustion chamber.

7. A HCCI engine according to claim 1, further comprising a controller for sensing a plurality of engine operating parameters and for operating the driver in response to the values of the sensed operating parameters so as to minimize unwanted pressure excursions within the combustion chamber resulting from changes in the octane rating of fuel being burned by the engine.

8. A HCCI engine according to claim 1, further comprising a spark plug having electrodes extending within the combustion chamber.

9. A HCCI engine according to claim 1, wherein said fuel system comprises a carburetor for mixing an air and fuel charge prior to entry of the charge into the combustion chamber.

10. A HCCI engine according to claim 1, wherein said fuel system comprises a port fuel injection system for introducing fuel into air charge flowing into the combustion chamber.

11. A HCCI engine according to claim 1, wherein said fuel system comprises a fuel injection system for introducing fuel directly into the combustion chamber.

12. A HCCI engine, comprising:

a cylinder block having a cylinder formed therein;

a cylinder head mounted upon the cylinder block for closing the cylinder;

a power piston slidably contained within the cylinder;

a combustion chamber defined by said cylinder head, said cylinder, and said power piston;

a crankshaft, with said power piston being attached to said crankshaft by a connecting rod;

a fuel system for introducing fuel into the combustion chamber;

a boost piston for initiating timed combustion of fuel within the combustion chamber, with said boost piston being housed within a wall of said combustion chamber such that when the boost piston moves from a base position to an extended position the effective compression ratio of the cylinder increases;

a driver for moving the boost piston from a base position to an extended position during successive compression strokes of the engine, so as to cause fuel within the combustion chamber to burn in response to movement of the boost piston;

a controller for operating the driver so as to control not only the timing of the movement of the boost piston but also the amount by which the boost piston increases the compression ratio of the engine; and a follower which engages said boost piston and which is effective to selectively alter the extent to which the boost piston extends into said combustion chamber.

13. A HCCI engine according to claim 12, wherein said controller operates the driver so as to produce a relatively lower compression ratio in the event that the fuel has a lower octane rating and a relatively higher compression ratio in the event that the fuel has a higher octane rating.

14. A HCCI engine according to claim 12, wherein said controller operates the driver so that the timing of the onset of combustion is advanced when the fuel has a higher octane rating and retarded when the fuel has a lower octane rating.

15. A HCCI engine according to claim 12, further comprising a spark plug operated by the controller so as to begin combustion of fuel within the cylinder when the operating temperature of the engine is less than a threshold value.

16. A HCCI engine according to claim 12, further comprising a spark plug operated by the controller so as to begin combustion of fuel within the cylinder in the event that an increase of heat within the combustion chamber resulting from movement of the boost piston is insufficient to initiate combustion.

* * * * *